April 2, 1929.                    J. BERG                    1,707,622
                    THEFTPROOF DEVICE FOR TIRE CARRIERS
                           Filed Feb. 10, 1926
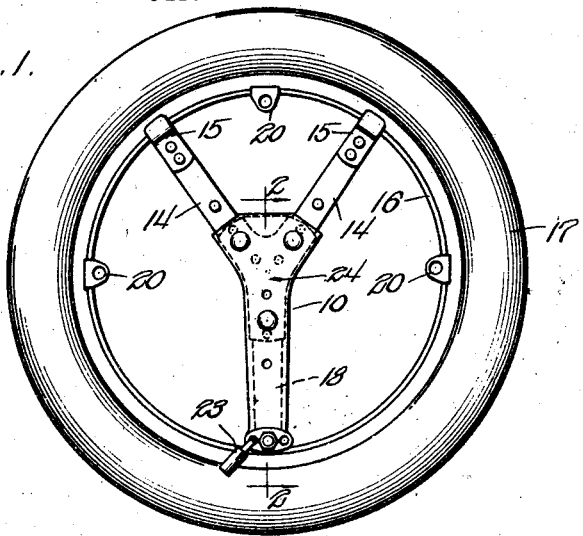
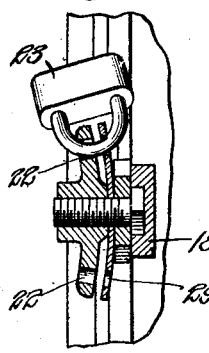
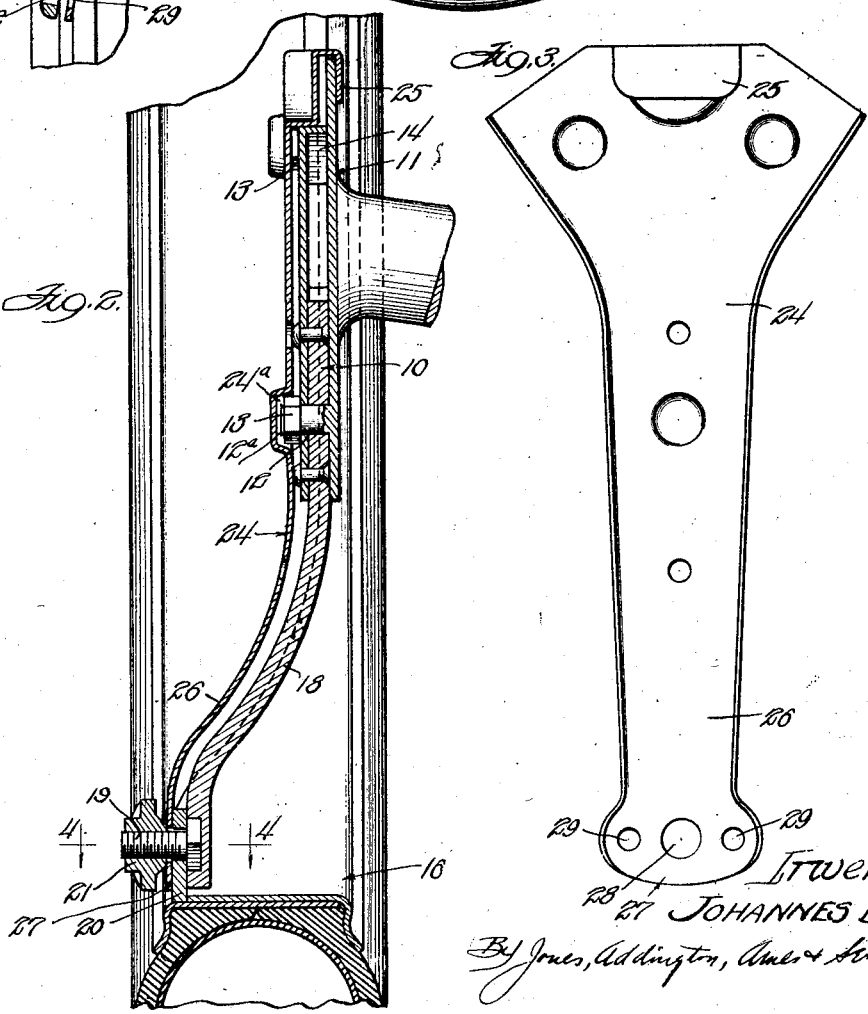
Inventor:
JOHANNES BERG Patented Apr. 2, 1929.

1,707,622

UNITED STATES PATENT OFFICE.

JOHANNES BERG, OF CHICAGO, ILLINOIS.

THEFTPROOF DEVICE FOR TIRE CARRIERS.

Application filed February 10, 1926. Serial No. 87,209.

This invention relates to theft proof devices for spare tire carriers of automobiles and relates particularly to theft proof devices comprising shield members for preventing access to the means for securing spare tire carriers to automobiles.

In a well known make of automobile, which type constitute a great percentage of automobiles in use today, a Y-shaped securing member or carrier is secured to a support on the automobile by means of three bolts and nuts. After the carrier is in position on the car, a small measure of precaution against theft is taken by upsetting the ends of the bolts projecting through the nuts. As an added measure of precaution, a lock is provided for locking the spare tire and rim to the carrier.

It will be apparent that, although the spare tire is locked to the carrier, the nuts holding the carrier to the support may be readily forced from their bolts and both the spare tire and carrier taken from the car.

As a result of the present invention, a shield member is provided to prevent access to the aforementioned nuts, said shield being adapted to be locked in position by means of the same lock which is provided for securing the spare tire to the carrier.

One of the objects of this invention is to provide a theft proof device for preventing access to the means for securing spare tires to automobiles.

Other objects and advantages will be apparent from the following description and the accompanying drawing, in which drawing:

Figure 1 is a face view of a spare tire carrier showing the device mounted in position;

Fig. 2 is a vertical, sectional view through the device showing the associated elements in dotted lines;

Fig. 3 is a rear elevational view of the device; and

Fig. 4 is a section on the line 4—4 of Fig. 2.

Referring more particularly to the drawings, a V-shaped bracket or carrier 10 is secured to a support 11 of an automobile by means of bolts 12 projecting from the support 11 through the carrier and secured by means of nuts 13. The bolts 12 are provided of such length as to project through the nuts, and the projecting portions are upset as at 12ª to provide, in some measure, for their not being removable except by use of force.

The upper members 14 of the Y-shaped carrier 10 are provided with forked projections 15 upon which the rim 16 of the spare tire 17 rests. The lower member 18 is provided with a projection 19 comprising a bolt, the head of which is embedded in said member, and which projection extends through one of the lugs 20 to be held in position by means of a wing-shaped nut 21, the latter having an aperture 22 on each wing thereof. A lock 23 is inserted in one of the apertures 22 to prevent the nut from being unscrewed. It is obvious that should an attempt be made to unscrew the nut, the lock will strike the rim 16 and prevent further movement thereof.

As has been hereinbefore stated, the nuts 13 are prevented, in a small measure, from being removed by the upsetting of the bolts 12, but this has not proven an adequate means of protection, since the nuts heretofore have been forced from the bolts. This invention provides a channel-shaped shield member 24 adapted to form a housing for the lower part of the Y-shaped carrier 10, covering the nuts and thus preventing access thereto. Recesses 24ª are provided in the shield member to afford clearance for the nuts 13 and which also permits of a more compact structure. The upper end of the shield 24 has a hook-shaped projection 25 for engaging the support 11, and the lower end 26 of the shield 24 has an enlarged surface 27 conforming substantially in size and shape to the wing-nut 21. The enlarged surface 27 has an aperture 28 for receiving the projection 19 and is disposed adjacent the outer side of the lug 20 and held thereagainst by means of nut 21.

The enlarged surface 27 of the shield member 24 includes an aperture 29 on each side of the aperture 28, and these apertures are so disposed as to register with the apertures 22 formed in the wing-nut 21. When the nut 21 is in position, the lock 23 is inserted in one of the sets of registering apertures thereby preventing the turning of the nut for removal.

It is evident that the shield member 24 is securely held in position and can not be removed except by means of removing the lock, the hook-shaped projection 25 securing the upper end of said shield and the nut and lock securing the lower end of said shield. By the hereinbefore described manner of the shield member covering the nuts, they are not accessible for removal, and this novel method of my invention prevents the theft of the tire or carrier.

While a single embodiment of this invention is herein shown and described, it is to be understood that this device is not to be limited to the exact structure or details thereof, since various other forms will be apparent to one skilled in the art and, consequently, it is to be limited only by the scope of the appended claims and the prior art.

I claim:

1. The combination with a spare tire carrier, a support, and a detachable securing member for securing the tire carrier to the support, of means for preventing the removal of the tire carrier from the support comprising a shield member adjacent said securing member and having an aperture therein, a hook-shaped projection secured to said shield member and adapted to engage said support, a lock nut having an aperture for registration with said aperture in said shield member, and a lock for engaging said registering apertures.

2. The combination with a spare tire carrier, a support, and a detachable securing member for securing the tire carrier to the support, of means for preventing the removal of the tire carrier from the support comprising a shield member adjacent said securing member and having an aperture therein, a lock nut having an aperture for registration with said aperture in said shield member, and a lock for engaging said registering apertures.

3. In a theft preventing device for tire carriers, a Y-shaped carrier having securing means for attaching to a support of an automobile, a shield member extending over and preventing access to said securing means, said shield member having a hook extending between the upper forks of the Y and hooking over the edge of said carrier, and a lock for securing said shield member in place.

4. In a theft preventing device for tire carriers, a forked carrier having securing means for attaching it to a support on an automobile, a shield member overlying and preventing access to said securing means, said shield member having a hook extending between the arms of the fork and hooking over the edge of the carrier, and a lock for securing said shield in place.

5. In a theft-preventing device for tire carriers a Y-shaped carrier having securing means for attaching to a support of an automobile, a shield member extending over and preventing access to said securing means, said shield member having a hook extending between the upper forks of the Y and hooking over the edge of the carrier, and a lock for securing said shield member in place, said shield having an arm portion overlying the lower leg portion of the Y, said lock cooperating with said overlying arm portion.

6. In a theft preventing device for tire carriers, a Y-shaped carrier having securing means for attaching to a support of an automobile, a shield member extending over and preventing access to said securing means, said shield member having a hook extending between the upper forks of the Y and hooking over the edge of the carrier, and a lock for securing said shield member in place, said shield having an arm portion overlying the lower leg portion of the Y, said lock cooperating with said overlying arm portion, said securing means being adjacent the central portion of the Y-shaped carrier.

In witness whereof, I have hereunto subscribed my name.

JOHANNES BERG.